United States Patent
Ferreira et al.

(10) Patent No.: US 12,554,994 B2
(45) Date of Patent: Feb. 17, 2026

(54) VERTICAL FEDERATED FOREST FOR DIVERSITY IN MACHINE LEARNING

(71) Applicant: Dell Products L.P., Round Rock, TX (US)

(72) Inventors: Paulo Abelha Ferreira, Rio de Janeiro (BR); Adriana Bechara Prado, Niteroi (BR)

(73) Assignee: Dell Products L.P., Round Rock, TX (US)

( * ) Notice: Subject to any disclaimer, the term of this patent is extended or adjusted under 35 U.S.C. 154(b) by 770 days.

(21) Appl. No.: 17/822,321

(22) Filed: Aug. 25, 2022

(65) Prior Publication Data

US 2024/0070473 A1    Feb. 29, 2024

(51) Int. Cl.
*G06N 5/01* (2023.01)
*G06F 18/241* (2023.01)

(52) U.S. Cl.
CPC ............. *G06N 5/01* (2023.01); *G06F 18/241* (2023.01)

(58) Field of Classification Search
CPC ................................ G06N 5/01; G06F 18/241
See application file for complete search history.

(56) References Cited

U.S. PATENT DOCUMENTS

| | | | |
|---|---|---|---|
| 2013/0346346 A1* | 12/2013 | Criminisi | G06N 7/01 706/12 |
| 2015/0242815 A1* | 8/2015 | Velasco | G06Q 10/1053 705/321 |
| 2019/0102692 A1* | 4/2019 | Kwant | G06F 18/2411 |

OTHER PUBLICATIONS

Wei, Kang, Jun Li, Chuan Ma, Ming Ding, Sha Wei, Fan Wu, Guihai Chen, and Thilina Ranbaduge. "Vertical federated learning: Challenges, methodologies and experiments." arXiv preprint arXiv:2202. 04309 (2022). (Year: 2022).*
Liu, Y., Liu, Y., Liu, Z., Liang, Y., Meng, C., Zhang, J., & Zheng, Y., "Federated Forest", May 24, 2019.
U.S. Appl. No. 17/648,447, titled "Explainable Response Time Prediction of Storage Arrays Detection", filed Jan. 20, 2022.
Raghavan, M., Barocas, S., Kleinberg, J., & Levy, K., "Mitigating Bias in Algorithmic Hiring: Evaluating Claims and Practices." In Proceedings of the Conference on Fairness, Accountability, and Transparency. Dec. 6, 2019.

* cited by examiner

*Primary Examiner* — Casey R. Garner
(74) *Attorney, Agent, or Firm* — Workman Nydegger

(57) ABSTRACT

One example method includes receiving a random forest classifier model that comprises a group of decision trees, wherein the random forest classifier model is created using a vertical federated framework, providing new observations, not included in a set of training observations, to a trained random forest classifier model, wherein the random forest classifier model is trained in the vertical federated framework, and wherein the training is performed using the set of training observations as input to the random forest classifier model, and generating, by the trained random forest classifier model, one or more diversity scores pertaining to the new observations.

20 Claims, 7 Drawing Sheets

VERTICAL FEDERATED FOREST FOR DIVERSITY IN MACHINE LEARNING

FIELD OF THE INVENTION

Embodiments of the present invention generally relate to machine learning models. More particularly, at least some embodiments of the invention relate to systems, hardware, software, computer-readable media, and methods for providing explainable machine learning models in settings where data handled by the machine learning models is sensitive, and may require privacy, and where data nodes may not have access to the complete set of sample attributes.

BACKGROUND

In the field of hiring, for example, emphasis has been placed on the need to quickly and effectively evaluate job candidates. While some enterprises have developed their own proprietary models for this purpose, those models often lack transparency. That is, it is not readily apparent how the models have arrived at conclusions such as the suitability, or not, of a candidate. This lack of transparency is driven at least in part by a need for the enterprise to keep job candidate information private. However, a competing concern is that an enterprise may have to demonstrate to a third party, such as an auditor or government entity, how the enterprise makes hiring decisions. Thus, the enterprise may be caught between maintaining privacy on the one hand, but having a need to make its evaluation processes transparent, on the other hand.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
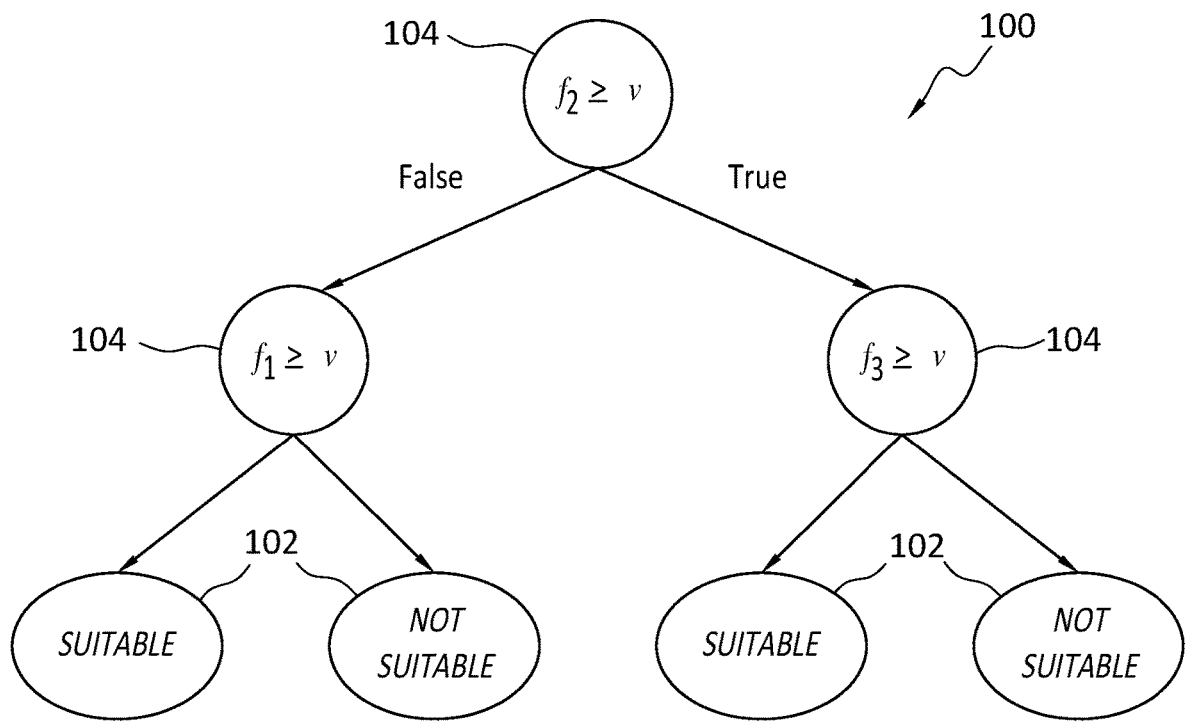
FIG. 1 discloses an example decision tree classifier, where the leaves are the possible classes.

Embodiments of the present invention generally relate to machine learning models. More particularly, at least some embodiments of the invention relate to systems, hardware, software, computer-readable media, and methods for providing explainable machine learning models in settings where data handled by the machine learning models is sensitive, and may require privacy, and where data nodes may not have access to the complete set of sample attributes.

In general, example embodiments of the invention concern VFL (vertical federated learning). Although there have been great advances in VFL, there is no known approach that is able to train an explainable model while at the same time keeping the data private and being able to output diversity scores per sample. Some example embodiments of the invention may thus provide for the integration of diversity detection into RF (random forest) models which are built via a VFL setting.

Some example embodiments may comprise a combination of two techniques, namely, (1) computation of a diversity score, as disclosed in U.S. patent application Ser. No. 17/648,447, entitled EXPLAINABLE RESPONSE TIME PREDICTION OF STORAGE ARRAYS DETECTION, filed 20 Jan. 2022 ("'447 Application"), and incorporated herein in its entirety by this reference, and (2) integration of the diversity score into an algorithm for RF VFL, where an example of such an algorithm is disclosed in Liu, Y., Liu, Y., Liu, Z., Liang, Y., Meng, C., Zhang, J., & Zheng, Y. (2020). *Federated forest. IEEE Transactions on Big Data.* ("*Liu*"), incorporated herein in its entirety by this reference.

In more detail, some example embodiments may provide explainability through the computation of what may be referred to herein as a diversity score from a Random Forest classifier trained in a VFL setting. More specifically, (i) some embodiments may focus on models based on Decision Trees, as powerful self-explaining models, and (ii) some embodiments may also provide for the integration of an outlier detection scheme which, at prediction time, may quantify how different a sample being evaluated is in comparison with the samples, in the training set, that led to the same prediction. In this way, example embodiments of the model may provide a diversity score associated to each of the predictions, making it possible to evaluate, at the same time, how diverse previously unseen observations are with respect to training samples, and identify a confidence level with respect to the predictions given by the classifier.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of some embodiments of the invention is that an explainable model may be trained, while still maintaining the privacy of data used in the training. As another example, some embodiments may be able to output diversity scores, per sample, that may enable various analyses to be performed, including the diversity of previously unseen observations relative to model training samples, and determination of a confidence level in predictions generated by a classifier. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Introduction

Some example embodiments are directed to the problem of providing explainable Machine Learning models in a setting where data is sensitive and data nodes may not have access to the complete set of sample attributes, or features. For example, such data nodes have information about the same group of people, but some of the data nodes may know the age of the people, while other data nodes may know only the income of those people. Thus, some example embodiments involve a distributed machine learning (ML) setting, and specifically, a vertical federated learning (VFL) approach. Federated learning (FL) is a distributed framework for machine learning where data nodes jointly train a model without ever sharing their data. VFL may be applicable to the cases where data nodes share the same sample ID space but differ in feature space. As noted earlier herein, some example embodiments may provide explainability through the computation of a diversity score from a RF classifier trained in a VFL setting.

B. Illustrative Use Case

An example use case is now presented to illustrate and explain aspects of some embodiments. Note however that the use case is presented by way of example only and is not intended to limit the scope of the invention in any way. More generally, example embodiments may be applicable to RF classifiers in connection with which there is a need to explain model decisions in a VFL setting.

This example use case is concerned with algorithmic candidate screening, where a goal is to obtain a fair screening strategy that leads to a diverse pool of candidates to be considered, for example, for an interview. The next section provides some details about conventional candidate screening tools.

There has been growing interest in the use of algorithms for hiring, in particular as a vehicle to mitigate fairness issues related to screening and hiring. In general, there may be four main stages of a hiring pipeline: (1) sourcing; (2) candidate screening; (3) candidate interviewing; and (4) candidate selection. Sourcing may include building a candidate pool, which may then be screened to choose a subset of candidates to interview. In the context of this disclosure, an example embodiment may be directed to candidate screening, that is, it may be an aim of such an embodiment to implement a fair screening strategy that leads to a diverse pool of candidates to be considered.

With the current advent of ML in many different areas, it is no surprise that candidate screening is currently also being automated. One example of such automation is the selection of candidates based on a selected number of competencies, which are evaluated and quantified by algorithmic pre-employment assessments. According to a recent study on the subject (see Raghavan, M., Barocas, S., Kleinberg, J., & Levy, K. (2020). *Mitigating Bias in Algorithmic Hiring: Evaluating Claims and Practices. In Proceedings of the Conference on Fairness, Accountability, and Transparency. ACM*) (*"Raghavan"*), the most popular assessment types are questions, video interview analysis and gameplay such as by way of puzzles or video games. For video interviews, candidates are typically asked to record answers to particular questions and then the video transcripts are analyzed by the tools, which provide scores for several competencies. In the case of question-based assessments, those may include personality tests, and situational judgments tests. Finally, some vendors also offer games aiming at evaluating specific competencies, such as numerical agility.

Typically, vendors offer custom or pre-built algorithmic pre-employment assessments. Some example embodiments of the invention may be particularly focused on the former, that is, custom algorithmic pre-employment assessments. Generally speaking, in the case of a custom assessment, a given company, as the client of a vendor, may (i) ask their employees to take the assessment, and then (ii) link the assessment results to performance scores, such as sales numbers for example, of the same employees. In this way, a training dataset may be built that includes the assessment results as features, and a performance score as the target attribute. Thus, the idea with this described approach is that the final ML model will learn, from this training data, the relationships between employee performance scores and their assessment results. In other words, the ML model will be able to predict how a given candidate would perform in the company in question, given his/her assessment results.

One of the concerns brought up by researchers in the field is that by predicting the success of future employees based on assessments and/or attributes of current employees, the company may skew the task toward finding candidates similar to those who have already been hired and this may potentially reduce the chance of increasing the diversity of the workforce. Indeed, according to the study noted above, very few vendors disclose specifics on how these tools perform for a diverse group of applicants—for example, with respect to gender, ethnicity, race, and age—and if/how the tools are able to select a diverse pool of candidates in a fair and explainable way.

Given this background, a problem posed by conventional approaches may be expressed as the problem of providing explainable ML models in a VFL setting. Thus, in some example embodiments, explainability may provided through the computation of a diversity score from a Random Forest (RF) classifier trained in such a setting. As noted herein, few vendors disclose specifics on how these tools perform for a diverse group of applicants and if/how the tools are able to select a diverse pool of candidates in an explainable and fair way. Accordingly, some embodiments of the invention may operate to provide transparency in the operation of, and results produced by, ML models. In general, such embodiments may give to their users the ability to evaluate how different new observations are in comparison to the observations used to train the machine learning model in question.

C. Context for Some Example Embodiments

C.1 Random Forests

Some example embodiments of the invention are concerned with the problem of classification. For example, consider the problem related to candidate screening, for which one could be interested in predicting classes, such as 'Suitable,' or 'Not suitable,' for the job, from personality trait features, such as introvert to extrovert spectrum or enthusiasm spectrum, which are the input values. For a single input, each attribute is called a feature. One example of a machine learning model that can perform such task is a random forest classifier.

One example of an ML model that can perform such task is an RF (random forest) classifier. An RF classifier may predict a categorical output value, that is, a class, by exploiting what are referred to as decision trees. In one example approach, each decision tree runs the input through a series of inequality tests over its attribute-values until the input ends up in a leaf of the decision tree. This leaf contains the predicted class for the given input. An example of a decision tree is disclosed in FIG. 1.

More particularly, FIG. 1 discloses an example decision tree classifier 100 in which the leaves 102 are the possible classes. With reference to FIG. 1, assume an input X having three attributes, or features, called f1, f2, and f3. To predict the class associated to X, the input X runs through the decision tree classifier 100 and passes a series of tests 104, in the form of respective inequalities, over its attribute-values. When the answer is negative, the input X continues to the left in the tree classifier 100, and when the answer is positive, the input X continues to the right in the tree classifier 100. Each test, which may be in the form of an inequality 104 in the case of FIG. 1, directs the X input towards a subset of internal nodes until the input X reaches one of the leaves 102.

A decision tree classifier, such as the decision tree classifier 100, may be learned and constructed from data observations, or samples. An RF classifier may comprise many different decision trees, such as the decision tree classifier 100 for example, whose results may be compiled, such as through the use of a majority vote mechanism for example, into a single final classification for the input. A possible advantage of applying many decision trees is that such an approach may increase variability and decrease the chance of overfitting the training data, that is, to decrease the chance of applying a single decision tree that is too fine-tuned to the training set and performs poorly in the test set. RFs may have various advantages over other ML models for classification since RFs: (1) require few hyperparameters—that is, parameters that need to be set a priori and cannot be learned; (2) are efficient to build and do not require complex infrastructure for learning; (3) are efficient to execute when predicting; and (4) are more explainable than other black-box models, such as Neural Networks.

Among other things, example embodiments may operate to train an RF classifier using a prepared dataset. In more detail, some embodiments may train an RF classifier to predict classes of the target attribute, as described earlier herein. Such training process may require a central data node equipped to perform this task. RF training does not typically require GPU (graphics processing unit functionality/performance), so a data node with a number of available CPUs (central processing units) is expected to be able to provide enough infrastructure for the RF training.

C.2 Outliers

Figure 2:
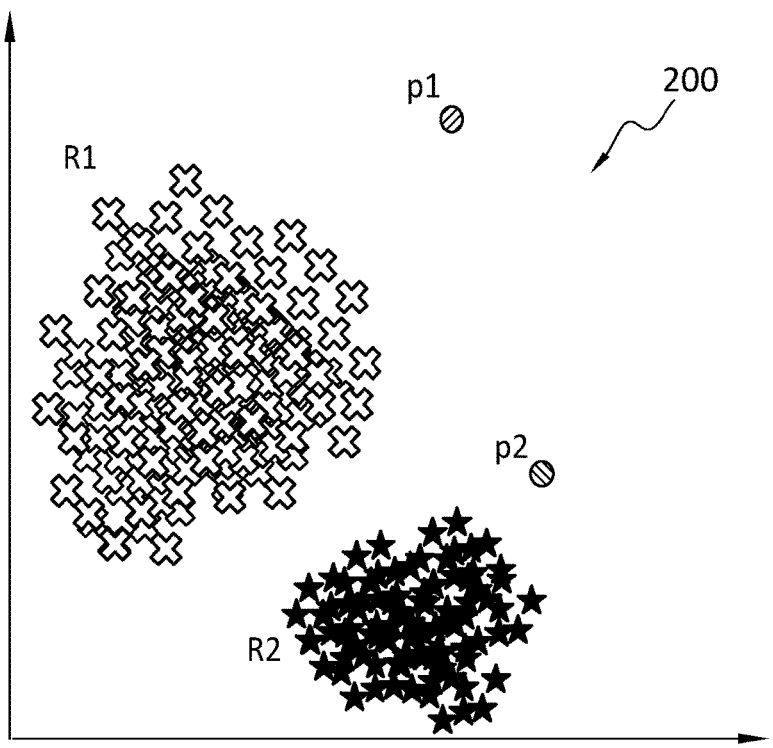
FIG. 2 discloses an illustration of outliers.

As used herein, an 'outlier' refers to a data point that is significantly different from the remaining data in a set that includes the data point. Another definition found in the literature is: "An outlier is an observation which deviates so much from the other observations as to arouse suspicions that it was generated by a different mechanism." FIG. 2 discloses a plot 200 that illustrates the definition of outliers in a 2D (two dimensional) example. In general, points that lie far away from the normal regions R1 and R2 are considered outliers. Thus, points p1 and p2 constitute outliers in the example of FIG. 2.

Outliers are also referred to as anomalies in the ML literature. In most applications, the data is created by one or more generating processes, which could either represent an activity in a given system or observations collected about some entities. When the generating process behaves unusually, it results in the creation of outliers. Therefore, an outlier often contains useful information about abnormal characteristics of the systems and entities which impact the data generation process. Some example embodiments may use the outliers concept as a mechanism to quantify how different an observation being evaluated is with respect to the training observations, and how confident one might be with respect to the predictions given by the ML model.

C.3 Random Forest Outlier Detection

Following is an explanation of an outlier score calculation for a single decision tree. If a score for the entire RF is needed, an average may be taken across all the decision trees in that RF.

Some embodiments of the invention may assume that a decision tree model is trained from a set of observations $O=\{o_1, o_2, o_3, \ldots o_n\}$, referred to herein as the training dataset. Each observation in such a training dataset is composed of a set of features $F=\{f_1, f_2, f_3, \ldots f_m\}$. Further, as noted earlier, a decision tree is a binary tree composed of a set of nodes $N=\{n_1, n_2, n_3, \ldots n_k\}$, where each node represents an inequality test over a feature $f_j$. In order to predict the output, such as a job candidate performance score for example, of input such as a given new observation $y_i$ that is not an element of the training dataset, embodiments may run the new observation $y_i$ through a series of inequality tests until the observation $y_i$ ends up in a given leaf of the decision tree. That leaf carries the predicted value of the feature $f_j$ for that observation $y_i$. This process may be performed for each feature F in the set of features associated with that observation.

Figure 3:
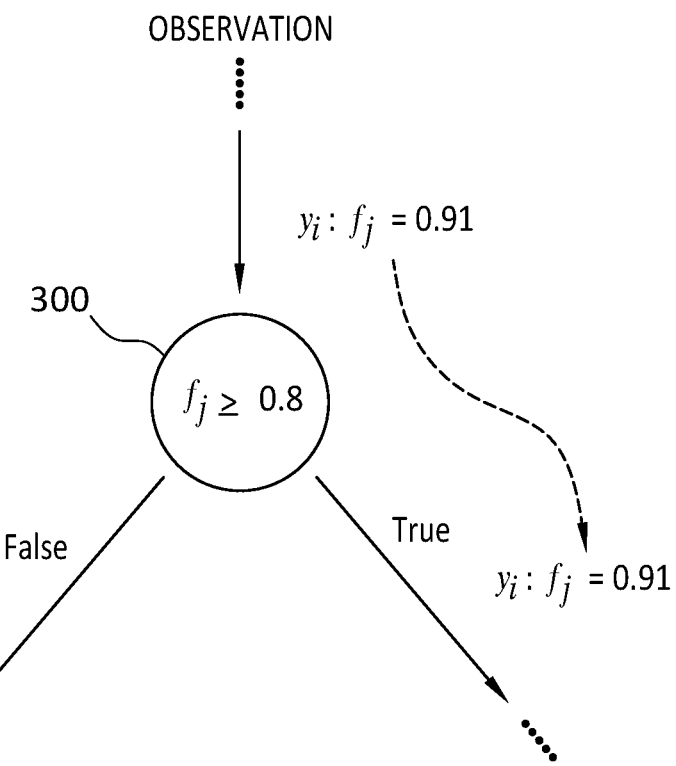
FIG. 3 discloses aspects of the structure and operation of an example decision tree.

With particular reference to the example node 300 disclosed in FIG. 3, it can be seen that a new observation $y_i$ follows a path in the decision tree that includes the node 300 according to the values of the features of that observation $y_i$. In the illustrative case of FIG. 3, the node 300 comprises the inequality test $f_j \geq 0.8$ and, accordingly, because the new observation $y_i$ has feature $f_j=0.91$, that feature falls to the right branch off the node 300.

In order to bring transparency to the structure and outputs of decision trees, as well as giving to their users the ability to evaluate how different new observations are in comparison to the observations in the training dataset, some embodiments of the invention may implement various functionalities. For example, and as discussed in further detail elsewhere herein, some embodiments may enrich the training stage with new functionalities. As another example, some embodiments may compute a diversity score for every new observation for which an output must be predicted. Note that as used herein, a 'new observation' is an observation that is not a part of the training dataset. Further information is provided below concerning each of these functionalities.

C.3.1 Enriching the Training Stage with New Functionalities

Figure 4:
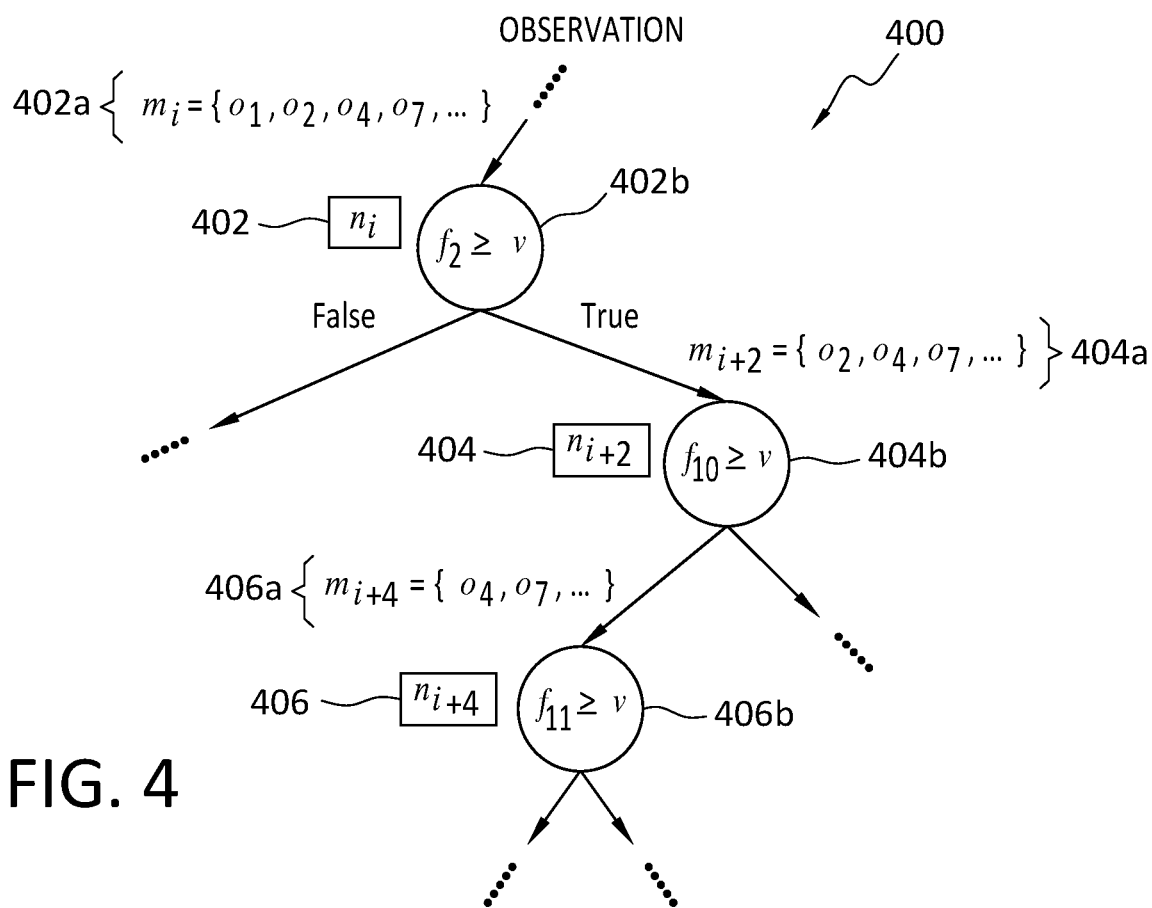
FIG. 4 discloses a data structure m that maps each node to the set of training observations that reached it from the parent node.

During the training process, each node $n_i$ in a decision tree, which may be referred to herein simply as a 'tree,' that is being trained keeps track of the observations in the training dataset that reached it, that is, those observations coming from one of the paths of its parent node. FIG. 4 illustrates this functionality. Particularly, when growing the tree 400, every node is mapped to a respective set of training observations $m_i$ which the node receives from one of the paths of its parent node. Thus, in the example of FIG. 4, node $n_i$ 402 is mapped to set $m_i$ 402, node $n_{i+2}$ 404 is mapped to set $m_{i+2}$ 404a, and node $n_{i+4}$ 406 is mapped to set $m_{i+4}$ 406a. Thus, in the tree 400 disclosed in FIG. 4, node $n_{i+2\ 404}$ is mapped to set $m_{i+2}$ 404a, which represents the set of training observations that reached the node 404, that is, the training observations that satisfied the inequality test 404b $f_2 \geq v$ that is associated with the parent node 402. Nodes 402 and 406 are likewise associated with respective inequality tests 402b and 406b.

To briefly recap, every node $n_i$ is associated with an inequality test over a feature $f_j$. Given this, at the end of the training stage, some embodiments may operate to calculate, for each node $n_i$ in the decision tree, a probability distribution over the values o:$f_j$, in $m_i$. Such probability distributions, one for each node, may be constructed via any probability function fitting method, such as Gaussian fitting, or Gaussian Mixture fitting for more flexible probabilities, for example. Once the probability distributions are constructed, embodiments may then store their parameters. For example, for a Gaussian distribution, an embodiment may only be required to store its mean and variance as a pair of parameters, that is, one pair of parameters for each node. This shows how example embodiments may be efficient in terms of minimizing the amount of extra data that may need to be stored.

C.3.2 Computing Diversity Scores for New Observations

Attention is directed now to some example processes for calculating a diversity score, DS, for every new observation that is run through the trained decision tree. Recall that a new observation is an observation that is not part of the training dataset that was used to train the decision tree that will be used for DS calculations.

C.3.2.1 Computing Local Diversity Scores for New Observations

With all probability distributions in hand, one for each node $n_i$ in the tree, some embodiments may then compute a local diversity score LDS(y, $n_i$), for every new observation y with respect to each node $n_i$ that is traversed by the new observation y. Recall that each $n_i$ is associated with an inequality test over a feature $f_j$. As an example of how to calculate LDS(y, $n_i$), consider FIG. 5, which discloses calculation of a local diversity score for two different new observations $y_1$ and $y_2$ for a given node $n_i$ 500 that is associated with an inequality test 502 over $f_j$.

Figure 5:
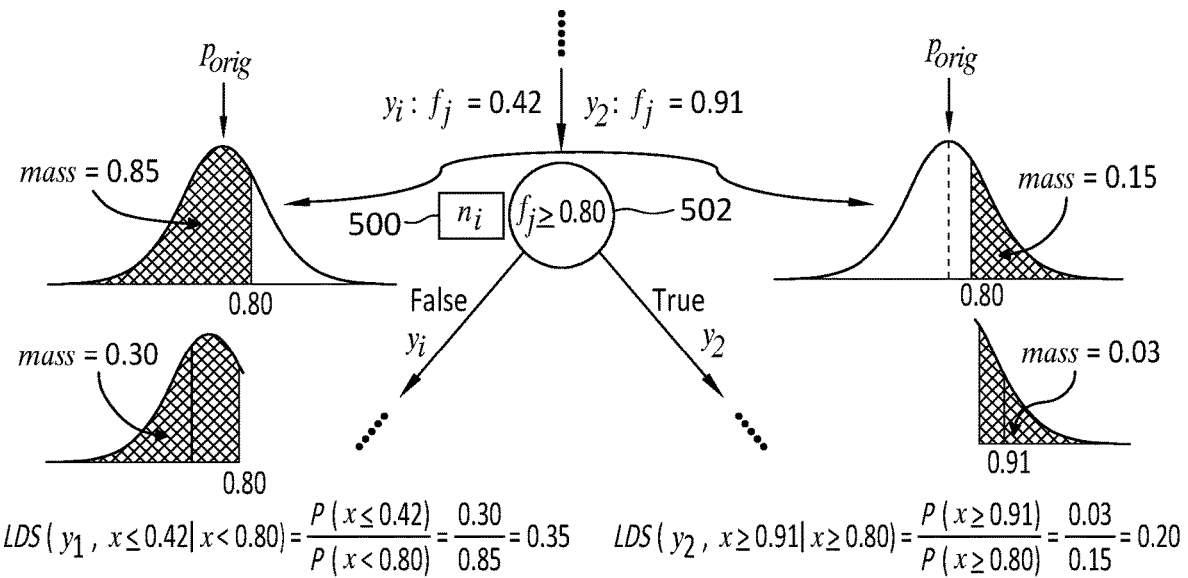
FIG. 5 discloses the calculation of a local diversity score for two different new observations $y_1$ and $y_2$ for a given node $n_i$ that is associated with an inequality test over $f_j$.

In FIG. 5, the probability distribution calculated for node $n_i$ during the training stage is denoted $P_{orig}$. The cut-off point of the illustrated node $n_i$ is at 0.80, since the inequality test 502 for node $n_i$ is $f_j \geq 0.80$. That cut-off point defines two different masses at node $n_i$ 500 namely, (1) the mass associated with observations that followed the left path of node $n_i$ 500 during the training stage, which in this example is 0.85, and (2) the mass associated with observations that followed the right path of node $n_i$ 500, which in this example is 0.15.

Note that the mass for a given interval may be calculated as the definite integral of the probability density function over the interval. Some example embodiments may consider commonplace probability functions, such as normal distribution with a Gaussian function, for which closed-form integrals are known and easy to calculate. Therefore, masses may be calculated easily without any extra significant costs.

Next, consider two new observations illustrated in FIGS. 5, $y_1$ and $y_2$, which traverse the trained tree. Since $y_2$: $f_j=0.91$, $y_2$ will follow the right path of $n_i$, whose mass is 0.15. In order to calculate LDS ($y_2, n_i$), some embodiments may compute how much of such mass is on the right of 0.91, which is 0.03, and then normalize that portion of mass thus: LDS ($y_2, n_i$)=0.03/0.15=0.20. Now, since $y_1$: $f_j=0.42$, observation $y_1$ will follow the left path of $n_i$, whose mass is 0.85. Then, LDS ($y_1, n_i$) is calculated in the same way as we calculate LDS ($y_2, n_i$), namely: LDS ($y_1, n_i$)=0.03/0.85=0.35, where 0.30 is the mass on the left of 0.42.

C.3.2.2 Computing a Diversity Score for Every New Observation

Observe that when a new observation y runs through a decision tree, it traverses a particular path starting from the root, and passing through a subset of nodes {n1 . . . , np}. Some embodiments may thus calculate an LDS for each node of the decision tree that y transits, and then aggregate all results into a single diversity score DS(y). One way to implement aggregation is to take the mean of all LDS across the path, thus:

$$DS(y) = \frac{1}{P}\sum_{i=1}^{P} LDS(y, n_i)$$

It is noted that embodiments are not limited to using the mean as the aggregation function. Other options include the log-likelihood mean, among others:

$$\frac{1}{P}\prod_{i=1}^{P} \log LDS(y, n_i)$$

The only requirement is that the function be a reasonable aggregation function to summarize the LDS into a single value.

Note that the lower DS(y), the more diverse y is with respect to the observations that trained the model. The value or magnitude of DS(y) may also indicate how confident the decision tree model is with respect to the prediction. For example, the lower the value, the lower the confidence in the prediction made by the decision tree model. It is also possible to go further and calculate DS for each new observation in a given data set, that is, a set of new observations. This approach may provide an array of diversity scores, where each element represents the diversity score for each of the new observations. Finally, some embodiments may chart the distribution of the value of this array in order to analyze the diversity of a set of new observations instead of just a single one.

C.4 Vertical Federated Forests

Figure 6:
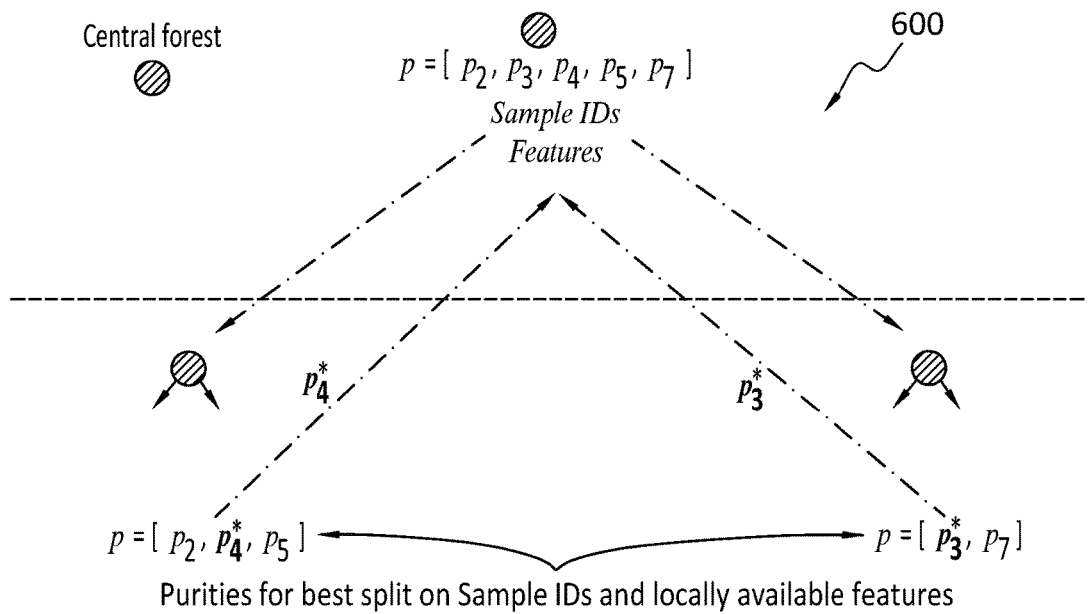
FIG. 6 discloses an example training of a vertical federated forest algorithm (e.g., obtaining purities).

In Liu, the authors present an algorithm for performing vertical FL with Random Forests. In the vertical setting, different data nodes (referred to herein as participants) jointly train a model without ever sharing their data. Each participant has access to all samples (unique sample IDs are assigned to each sample), but each participant has access restricted to a subset of features. This contrasts with horizontal FL, where all participants have access to all features, but each participant only has access to a disjoint subset of samples. The output of the algorithm is an RF. Each participant may have the full structure of the trees in the RF, however, a participant only has split information for tree nodes where it was the split winner, and the central participant (or coordinator) has access to the complete forest. Also, algorithms for training and for inference are presented, and inference can be performed even though no participant knows the full structure of the forest. FIG. 6 discloses an approach 600 for training of a vertical Federated Forest algorithm—obtaining purities—further details concerning which are disclosed in Liu.

C.4.1 Training

Figure 7:
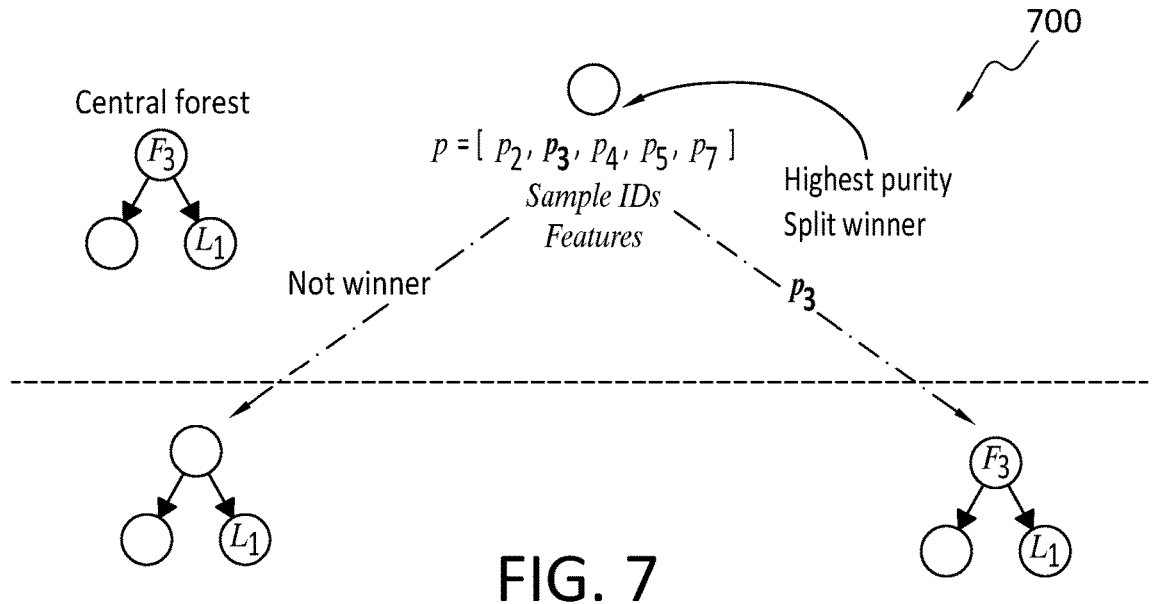
FIG. 7 discloses an example training of a vertical federated forest algorithm (e.g., selecting winner participant).

With reference now to FIG. 7, there is disclosed an approach 700 for training of the vertical Federated Forest algorithm—selecting winner participant, as disclosed in Liu.

In general, a tree node construction round may start with the central coordinator sampling unique IDs from the set of samples and sampling a subset of features for the round. Sample IDs and features are communicated to each participant—each participant only receives features which it has. In Liu, and FIG. 7, the central coordinator selected features 2, 3, 4, 5 and 7. However, the left participant only knows about features 2, 4, and 5, while the participant on the right only knows about features 3 and 7. Each participant may then compute the purity from splitting at each of its known features, and may then communicate its best purity to the central coordinator.

The central coordinator may then compute the highest purity—which relates to splits that may occur at the nodes (in Liu, feature 3). Note, however, that the algorithm is not limited to using 'purity' as a measure, and other measures in the literature would yield the same algorithm. This is then selected as the best feature for the tree node in this round and the central coordinator communicates this to each participant. The winner participant will receive a communication stating that its best feature has won, and all other participants will only receive the message that they were not the winner. Note that the central coordinator may decide which splits are best based on various metrics, and then communicates only to the winner participant.

Then, the non-winner participants store the split structure for this round tree node, without any feature split information, and the winning participant stores the complete tree node structure since it knows about the split. This may continue for several rounds until all splits have been completed, there may only be leaf nodes, to complete a tree. To construct a forest, the algorithm may be the same, just with an outer loop for constructing another tree. More details can be found in Liu.

C.4.2 Inference

Inference may work even though not all participants know about all splits and features. The approach 700 disclosed in FIG. 7 shows how inference may work for a single test sample, but it should be clear that this also works for a set of test samples. The test sample(s) is communicated to each participant. The participant then runs the sample through its forest—whenever the participant has the full split structure of a tree node, the participant performs the usual passing of the sample(s) through the correct path, either left or right. If the participant does not have the split information for the tree node, then the participant copies the sample through both paths, left and right.

Figure 8:
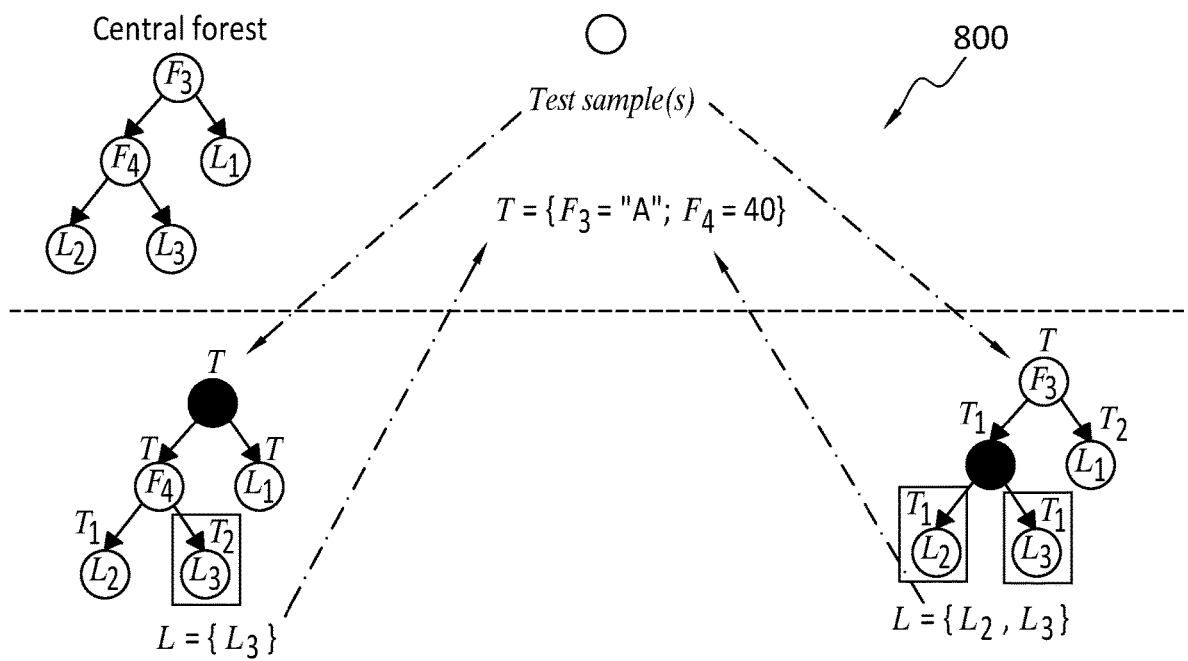
FIG. 8 discloses inferencing of a vertical federated forest algorithm.

With reference now to FIG. 8, there is disclosed an inference approach 800 of the vertical Federated Forest algorithm disclosed in the '447 Application. In FIG. 8, the test sample has passed through to leaf 3 for the left participant, and for the right participant, the test sample has arrived at leaves 2 and 3. The leaf indices are sent back to the central coordinator from each participant. The central coordinator may then perform an intersection n between all sets of leaves from each participant, per tree, and finishes knowing the selected leaf for each tree. In FIG. 8, it can be seen that leaf 3 was selected for the particular tree. Further details can be found in Liu.

D. Further Aspects of Some Example Embodiments

Some example embodiments may adapt the vertical Federated Forest algorithm in Liu to also compute a diversity score for samples not seen during the training phase. Some embodiments may assume a distributed setting, where there is a central participant, and edge participants. This is a vertical Federated Learning setting and, hence, all participants share the same set of samples through unique IDs, although each edge participant only has access to a subset of all available features for the samples. The RF may be constructed at the central participant, with all edge participants taking part, and each edge participant knowing only part of the structure of each decision tree.

As explained earlier herein, there may be two stages to follow when calculating a diversity score for a decision tree and, by generalization across multiple decision trees, to a random forest. These two stages comprise (1) enriching the training stage and (2) computing the diversity score per se. Therefore, embodiments may perform two adaptations to the method in Liu, one in the training phase and another in the inference phase. Further discussion of these two phases is set forth elsewhere herein.

During the training phase, some embodiments may operate to compute distributions per tree node. However, each participant only knows about a few of the tree nodes, that is, those tree nodes for which that participant was the split winner. Consider a participant which is currently the split winner for a given tree node during training. This participant will be able to fit a distribution to the feature values of the dual sample set that went to the left and to the right paths of the tree node. Therefore, the participant can, for instance, fit a Gaussian distribution to the respective values of each path, and communicate their parameters back to the central participant. The communication overhead may be small compared to the transfer of sample IDs that may have to occur. More concretely, it may be expected that communication of four real numbers will be performed, for example, a mean and standard deviation for each of two Gaussians, per tree node. More generally, the communication may comprise 2θ real numbers, where θ is the number of parameters for the distribution under consideration, and note that θ=2 for the Gaussian distribution.

Figure 9:
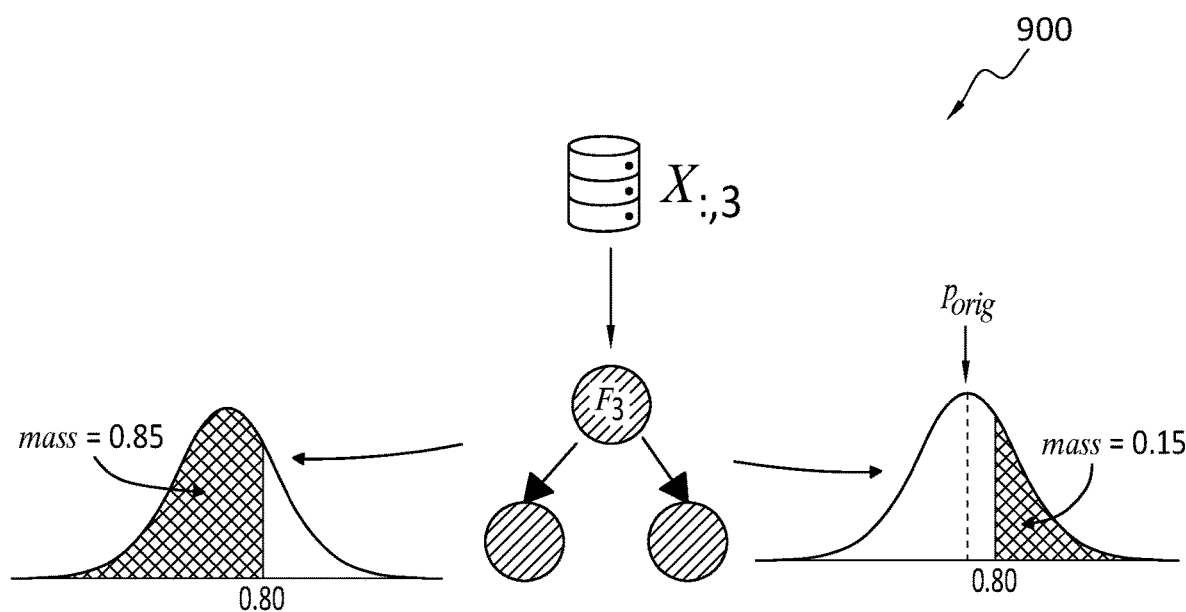
FIG. 9 discloses an example local computation of outlier distributions for the left and right path on an edge participant with winning split.

With reference now to FIG. 9, there is disclosed a local computation 900 of the outlier distributions for the left and right path on an edge participant with winning split. The winning feature in the example of FIG. 9 is $F_3$ and, therefore, embodiments may run the feature value for all samples (X:,3) through the split decision to compute the two distributions. This operation may be performed every time an edge participant is the winner for a split.

Once the central participant finishes constructing a complete decision tree, the central participant will have the distribution parameters for every node in the tree, even though it will not hold any information about the samples themselves nor about the feature values of the samples. Thus, embodiments are able to maintain privacy while calculating all distributions for the decision tree. The remaining trees for the whole RF may have their distributions obtained in the same way.

At inference time, for a single sample, or for a set of samples, the central participant will eventually know the path each sample took because the central participant is able to compute the intersection of leaves from each edge participant, as discussed earlier. Since the central participant knows the path taken by a sample, the central participant can calculate the DS for each sample. Embodiments may then take the average across all decision trees in the RF as the final DS score for each sample.

E. Further Discussion

As will be apparent from this disclosure, example embodiments may possess various useful features and aspects. For example, some embodiments may comprise an adaptation of the vertical Federated Forest algorithm in Liu to also consider (1) computing a diversity score for new observations (2) with privacy. Among other things, this approach may enable a user to evaluate how different new observations are in comparison to the observations used to train the machine learning model in question.

F. Example Methods

Figure 10:
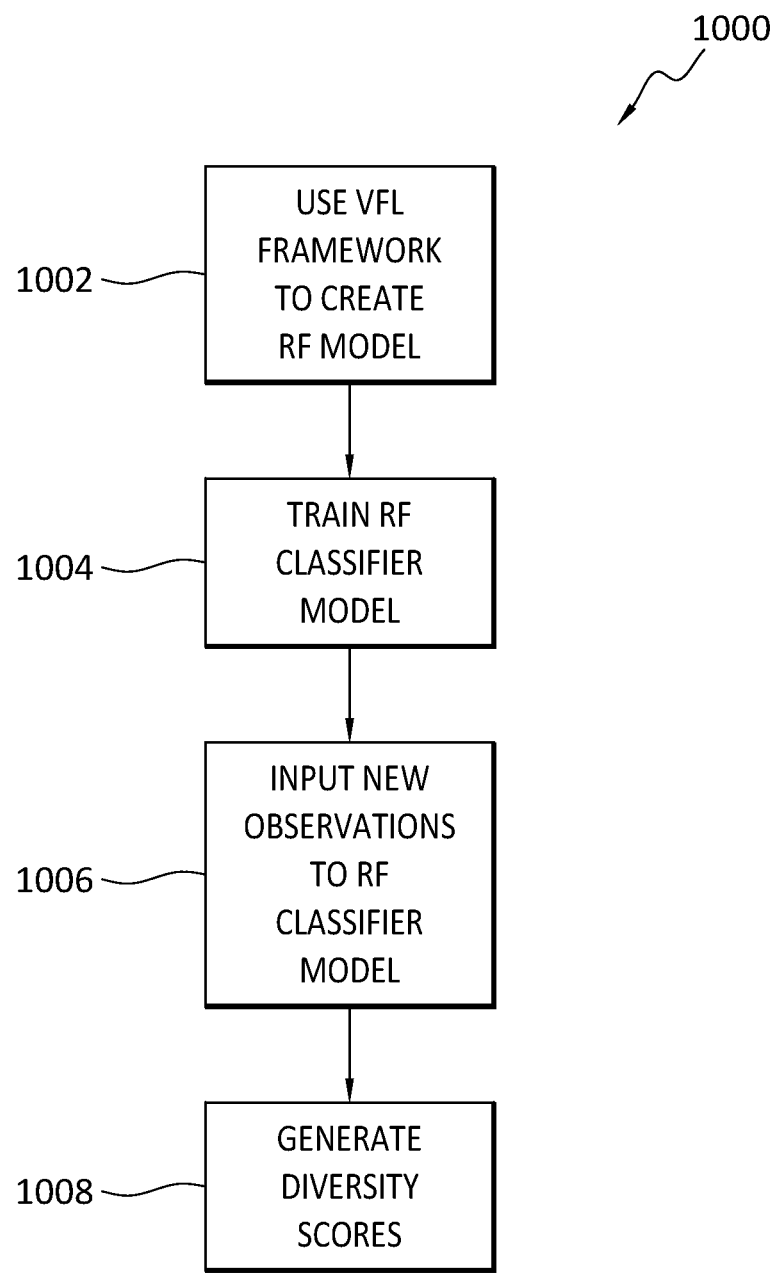
FIG. 10 discloses an example method according to some embodiments.

It is noted with respect to the disclosed methods, including the example method of FIG. 10, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 10, an example method 1000 according to some embodiments is disclosed. Initially, a VFL framework may be used to create 1002 an RF classifier model. Once the RF classifier model has been created 1002, the RF classifier model may then be trained 1004 with a set of training data. The training data may comprise observations and/or other input.

After the RF classifier model has been trained 1004, new observations may be input 1006 to the trained RF classifier model. Note that the new observations may be observations that the RF classifier model has not seen before, that is, the new observations were not included in the training data. The trained RF classifier model may then generate predictions and diversity scores 1008 based on the new observations that were received. The diversity scores may be generated 1008 for individual tree nodes, at a decision tree level, and/or across all the decision trees that are included in the RF classifier model.

G. Further Example Embodiments

Following are some further example embodiments of the invention. These are presented only by way of example and are not intended to limit the scope of the invention in any way.

Embodiment 1. A method, comprising: receiving a random forest classifier model that comprises a group of decision trees, wherein the random forest classifier model is created using a vertical federated framework; providing new observations, not included in a set of training observations, to a trained random forest classifier model, wherein the random forest classifier model is trained in the vertical federated framework, and wherein the training is performed using the set of training observations as input to the random forest classifier model; and generating, by the trained random forest classifier model, one or more diversity scores pertaining to the new observations.

Embodiment 2. The method as recited in embodiment 1, wherein one of the diversity scores indicates an extent to which one of the new observations differs from the set of training observations.

Embodiment 3. The method as recited in embodiment 2, wherein the one new observation and the set of training observations both correspond to a common prediction generated by the random forest classifier model both before, and after, the training has been performed.

Embodiment 4. The method as recited in any of embodiments 1-3, wherein the trained random forest classifier model comprises a group of tree nodes, and each of the tree nodes has access to all of the new observations but each tree node does not have access to all features of each of the new observations.

Embodiment 5. The method as recited in embodiment 4, wherein one or more of the features comprise sensitive data.

Embodiment 6. The method as recited in any of embodiments 1-5, wherein the training observations comprise information about current employees of an enterprise, and the new observations comprise information about job candidates under consideration by the enterprise.

Embodiment 7. The method as recited in any of embodiments 1-6, wherein each of the decision trees comprises one or more binary options that guide classification of training observations and new observations received by the random forest classifier model.

Embodiment 8. The method as recited in any of embodiments 1-7, wherein the diversity scores are generated by an outlier detection scheme implemented in the random forest classifier model.

Embodiment 9. The method as recited in any of embodiments 1-8, further comprising determining, by the random forest classifier model, a confidence level in a prediction that was generated based on the new observations.

Embodiment 10. The method as recited in any of embodiments 1-9, wherein one of the diversity scores is calculated across all of the decision trees in the random forest classifier model.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
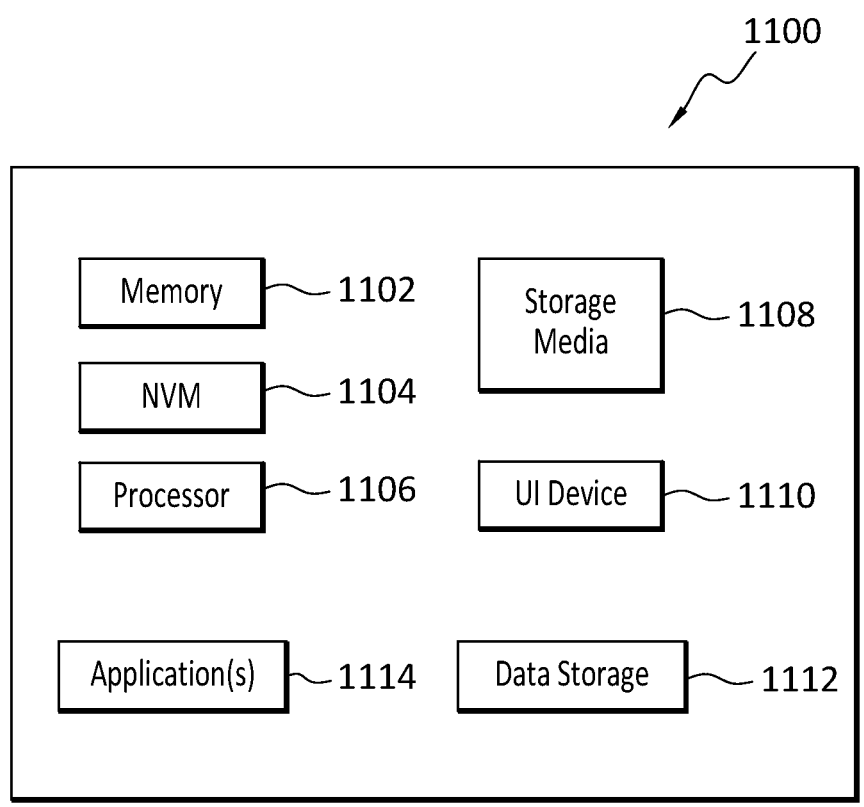
FIG. 11 discloses an example computing entity operable to perform any of the disclosed methods, processes, and operations.

With reference briefly now to FIG. 11, any one or more of the entities disclosed, or implied, by FIGS. 1-10 and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 11.

In the example of FIG. 11, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI (user interface) device 1110, and data storage 1112. One or more of the memory components 1102 of the physical computing device 1100 may take the form of solid state device (SSD) storage. As well, one or more applications 1114 may be provided that comprise instructions executable by one or more hardware processors 1106 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving a random forest classifier model, wherein the random forest classifier model is created using a vertical federated framework;

training the random forest classifier model using a set of training observations as input to the random forest classifier model, wherein the trained random forest classifier model comprises a group of decision trees, of which each decision tree includes a plurality of nodes, and wherein each node of the plurality of nodes represents a test over a respective test and includes a distribution parameter;

providing new observations, not included in the set of training observations, to the trained random forest classifier model, wherein the random forest classifier model is trained in the vertical federated framework; and generating, by the trained random forest classifier model, one or more diversity scores pertaining to the new observations, wherein each node of the plurality of nodes holds neither of any information about each of the training and new observations nor a feature value of each of the training and new observations.

2. The method as recited in claim 1, wherein one of the diversity scores indicates an extent to which one of the new observations differs from the set of training observations.

3. The method as recited in claim 2, wherein the one new observation and the set of training observations both correspond to a common prediction generated by the random forest classifier model both before, and after, the training has been performed.

4. The method as recited in claim 1, wherein each of the decision trees of the trained random forest classifier model has access to all of the new observations but does not have access to all features of each of the new observations.

5. The method as recited in claim 4, wherein one or more of the features comprise sensitive data.

6. The method as recited in claim 1, wherein the training observations comprise information about current employees of an enterprise, and the new observations comprise information about job candidates under consideration by the enterprise.

7. The method as recited in claim 1, wherein each of the decision trees comprises one or more binary options that guide classification of training observations and new observations received by the random forest classifier model.

8. The method as recited in claim 1, wherein the diversity scores are generated by an outlier detection scheme implemented in the random forest classifier model.

9. The method as recited in claim 1, further comprising determining, by the random forest classifier model, a confidence level in a prediction that was generated based on the new observations.

10. The method as recited in claim 1, wherein one of the diversity scores is calculated across all of the decision trees in the random forest classifier model.

11. A non-transitory storage medium having stored therein instructions that are executable by one or more hardware processors to perform operations comprising:

receiving a random forest classifier model, wherein the random forest classifier model is created using a vertical federated framework;

training the random forest classifier model using a set of training observations as input to the random forest classifier model, wherein the trained random forest classifier model comprises a group of decision trees, of which each decision tree includes a plurality of nodes, and wherein each node of the plurality of nodes represents a test over a respective test and includes a distribution parameter;

providing new observations, not included in the set of training observations, to the trained random forest classifier model, wherein the random forest classifier model is trained in the vertical federated framework; and generating, by the trained random forest classifier model, one or more diversity scores pertaining to the new observations, wherein each node of the plurality of nodes holds neither of any information about each of the training and new observations nor a feature value of each of the training and new observations.

12. The non-transitory storage medium as recited in claim 11, wherein one of the diversity scores indicates an extent to which one of the new observations differs from the set of training observations.

13. The non-transitory storage medium as recited in claim 12, wherein the one new observation and the set of training observations both correspond to a common prediction generated by the random forest classifier model both before, and after, the training has been performed.

14. The non-transitory storage medium as recited in claim 11, wherein each of the decision trees of the trained random forest classifier model has access to all of the new observations but does not have access to all features of each of the new observations.

15. The non-transitory storage medium as recited in claim 14, wherein one or more of the features comprise sensitive data.

16. The non-transitory storage medium as recited in claim 11, wherein the training observations comprise information about current employees of an enterprise, and the new observations comprise information about job candidates under consideration by the enterprise.

17. The non-transitory storage medium as recited in claim 11, wherein each node of the decision trees comprises a respective binary function that guides classification of training observations and new observations received by the random forest classifier model.

18. The non-transitory storage medium as recited in claim 11, wherein the diversity scores are generated by an outlier detection scheme implemented in the random forest classifier model.

19. The non-transitory storage medium as recited in claim 11, wherein the operations further comprise determining, by the random forest classifier model, a confidence level in a prediction that was generated based on the new observations.

20. The non-transitory storage medium as recited in claim 11, wherein one of the diversity scores is calculated across all of the decision trees in the random forest classifier model.

* * * * *